Aug. 7, 1962 W. L. TAYLOR 3,048,023
ICE MAKING APPARATUS AND CONTROL MECHANISM THEREFOR
Filed Sept. 16, 1959 6 Sheets-Sheet 1

INVENTOR
WESLEY L. TAYLOR
BY
ATTORNEY

Aug. 7, 1962 W. L. TAYLOR 3,048,023
ICE MAKING APPARATUS AND CONTROL MECHANISM THEREFOR
Filed Sept. 16, 1959 6 Sheets-Sheet 2

INVENTOR
WESLEY L. TAYLOR
BY
ATTORNEY

Aug. 7, 1962  W. L. TAYLOR  3,048,023
ICE MAKING APPARATUS AND CONTROL MECHANISM THEREFOR
Filed Sept. 16, 1959  6 Sheets-Sheet 3

INVENTOR
WESLEY L. TAYLOR
BY
ATTORNEY

Aug. 7, 1962 W. L. TAYLOR 3,048,023
ICE MAKING APPARATUS AND CONTROL MECHANISM THEREFOR
Filed Sept. 16, 1959 6 Sheets-Sheet 4

INVENTOR
WESLEY L. TAYLOR
BY
ATTORNEY

Aug. 7, 1962  W. L. TAYLOR  3,048,023
ICE MAKING APPARATUS AND CONTROL MECHANISM THEREFOR
Filed Sept. 16, 1959  6 Sheets-Sheet 5

INVENTOR
WESLEY L. TAYLOR
BY
ATTORNEY

Aug. 7, 1962  W. L. TAYLOR  3,048,023
ICE MAKING APPARATUS AND CONTROL MECHANISM THEREFOR
Filed Sept. 16, 1959  6 Sheets-Sheet 6

INVENTOR
WESLEY L. TAYLOR
BY
ATTORNEY

3,048,023
ICE MAKING APPARATUS AND CONTROL MECHANISM THEREFOR
Wesley L. Taylor, Glenview, Ill., assignor to The Dole Valve Company, Morton Grove, Ill., a corporation of Illinois
Filed Sept. 16, 1959, Ser. No. 840,346
5 Claims. (Cl. 62—135)

This invention relates to automatic ice making devices and more particularly relates to an automatic ice making apparatus utilizing flexible trays which can be twisted to effect ejection of ice blocks from the individual molds therein by shear and to a control mechanism for operating such an ice making apparatus.

The flexible ice trays of the present invention are more particularly described in Thomas B. Chace's copending application for patent entitled "Distortable Ice Tray and Control Mechanism Therefor," Serial No. 828,264, which has been assigned to the same assignee hereof.

In general, the ice tray is one which is elongated in form and which is formed of a flexible material having a plurality of ice molds formed therein and facing in one direction. Subsequent to freezing of water disposed in the several ice molds the elongated tray is rotated about its longitudinal axis. A rotating mechanism is associated with the tray to rotate one end of the tray relative to the other end of the tray thus resulting in a twisting action thereby mechanically and forcibly breaking the bond between the frozen ice blocks in the individual molds and the walls of the ice tray to which they adhere, by a shearing action.

By this means gravitational ejection of ice blocks from an ice tray is effected in which the bond between the ice blocks and the ice tray is broken by a forcible mechanical shearing action rather than by means of heat application to the ice blocks, such as has been used in the past. As a result, ice blocks are ejected into a collection tray in a dry state so that sticking of the ice blocks in the tray is prevented while, at the same time, the life of the tray is relatively quite long due to the fact that the stress on the tray resulting from flexure thereof is not highly localized.

When ice blocks in their respective molds in such ice trays have become completely frozen and the trays are then subsequently inverted, it has been found that the ice blocks will often fall from the molds without the application of any mechanical energy thereagainst due to the fact that freezing of the water in the lowermost parts of the molds acts to push the ice blocks from their respective molds. I have found, however, that prior to the time when the ice blocks within their respective molds have become completely frozen, the ice blocks will adhere to the walls of their respective ice molds and will not fall therefrom even when the ice trays are inverted. This fact is utilized to advantage in the ice making apparatus which is hereinafter more completely described since the ice trays are inverted prior to the time when the ice blocks within the respective ice molds thereof have completely frozen. The ice trays are, in fact, inverted, at least to some degree, shortly after an ice crust has been formed across the surface of the water within each of the individual molds. Since the ice crust remains within its respective mold even upon inversion of the ice tray the liquid between the ice crust and the bottom of the mold is retained within the ice mold and permitted to freeze subsequent to inversion or at least partial inversion of the ice tray.

The ice making apparatus which is hereafter described with particularity comprises generally an ice tray assembly mechanism which has a pair of opposed flexible ice trays of the type hereinbefore described disposed therein so that one of the ice trays may be disposed in a liquid receiving position while the other ice tray is disposed in a downwardly facing direction. One end of each of the flexible ice trays is pivotally mounted within the ice tray assembly mechanism so that that end of the tray may be rotated relative to the opposite end of the tray to twist the tray to effect ejection of ice blocks therefrom by a shearing action.

The entire ice tray assembly mechanism is, in turn, mounted on a shaft journalled within a support in a freezing compartment for corotatable movement therewith so that rotation of the shaft will act to rotate the entire ice tray assembly mechanism to selectively dispose one or the other of the ice trays in a liquid receiving position.

An ice sensing arm is associated with the ice making apparatus and is operable to prevent further cycling of the apparatus when the ice blocks within an ice block collection tray have reached a predetermined level.

Twisting of each of the flexible ice trays is effected by means of a heat motor of a type which is well known in the art and which is energized upon electrical energization of a resistor heater disposed in heat transfer relation therewith while rotation of the entire ice tray assembly mechanism is effected by means of a synchronous motor.

The heat motor may comprise an analog thermostat so that twisting of the flexible ice trays is effected as a function of the temperature of the liquid disposed within the ice trays though, in a simplified form, twisting of the trays could be effected by a simple non-analoging heat motor at predetermined intervals of time.

It is therefore a principal object of the present invention to provide an automatic ice making apparatus in which frozen ice blocks are mechanically and forcibly ejected from their individual molds and in which the ice tray is rotated during each freezing cycle to permit the ejected blocks to drop to a collection tray.

Another object of the invention resides in the provision of an automatic ice making apparatus for household refrigerators and the like which includes an ice tray assembly including a pair of oppositely disposed ice trays and a relatively simple control mechanism for effecting rotatable movement of the entire ice tray assembly mechanism and for applying torsion to the flexible molds to effect ejection of ice blocks therefrom when those trays are disposed in a downwardly facing direction.

Another object of the invention is to provide an ice making apparatus including an ice tray assembly mechanism having a pair of oppositely facing flexible molds disposed thereon in which rotation of the entire tray assembly is effected by means of a synchronous motor while twisting of the individual trays to effect ejection of frozen ice blocks therefrom is effected by means of a heat motor which may be rendered responsive to the temperature of liquid within the ice trays.

A still further object of the invention resides in the provision of a sensing arm which is operable to sense the level of frozen ice blocks within an ice block collection tray and which is further operable to prevent further cycling of the entire ice making apparatus when the frozen ice blocks within the collection tray have reached a predetermined level.

These and other objects of the invention will become apparent from time to time as the following specification proceeds and with reference to the accompanying drawings, wherein.

Figure 1:
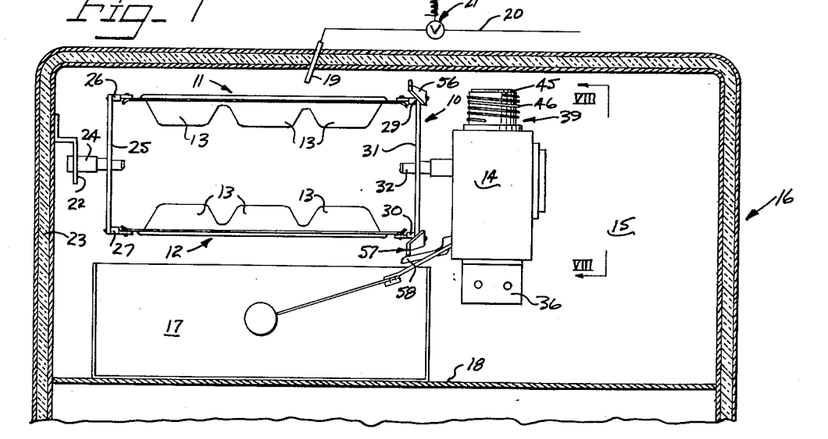
FIGURE 1 is a side elevational view of an ice making apparatus constructed in accordance with the principles of the present invention and which is shown as being mounted within the freezing compartment of a usual household refrigerator.

Referring first to FIGURE 1 of the drawings, the ice making apparatus is shown as comprising generally an ice tray assembly 10 including a pair of oppositely disposed ice trays 11 and 12 which have a plurality of individual ice molds 13 formed therein which face in opposite directions so that one of the ice trays may be disposed with its molds in an upwardly facing, liquid receiving position while the other ice tray is disposed with its molds in a downwardly facing direction. The ice tray assembly 10 is cooperable with a control mechanism 14 which is mounted on a back wall of a freezing compartment 15 of a usual household refrigerator 16 and which is operable to rotatably move the ice tray assembly and effect twisting of the flexible ice trays 11 and 12 to effect an automatic ice making operation and to effect ejection of ice blocks from the individual molds 13 into a collection tray 17. The collection tray 17 is disposed below the ice tray assembly 10 and is seated on the floor 18 of the freezing compartment 15.

A filler spout 19 is diagrammatically illustrated as being disposed within the upper wall of the freezing compartment 15 in a position to direct water to the molds within the upwardly facing ice tray 11 and as being connected to a suitable fluid supply line 20. A solenoid actuated valve is diagrammatically illustrated at 21 as being disposed within the fluid line 20 so that upon energization of the solenoid coil the valve will be opened to permit the flow of water through the filler spout 19 and thence into the molds in the upwardly facing ice tray 11.

The flexible ice trays 11 and 12 are preferably one-piece members which are formed of a tough plastic material such as linear polyethylene. While the ice trays may be formed of any suitable substance such as rubber, or plastic or the like it has been found that plastics are the most satisfactory in use since there is less tendency for the frozen ice blocks to adhere to the plastic mold than to a rubber mold. It has further been found that of the plastics having good flexure characteristics linear polyethylene is the most satisfactory substance which may be used to form the ice tray. Linear polyethylene is quite strong although it has good flexure characteristics. In addition I have found that frozen ice blocks do not tend to adhere very strongly to the linear polyethylene. Furthermore, linear polyethylene exhibits substantially no fatigue subsequent to distortion thereof so that by forming a tray of such a substance the tray will generally return under its own resiliency to its molded configuration without an additional application of external mechanical forces. However, in order to insure a positive return of the tray, spring means serve to urge it to its molded configuration and will be later described.

A supporting bracket 22 is affixed to a side wall 23 of the freezing compartment 15 and has an aperture formed therein which is adapted to rotatably receive a shaft 24, which is affixed to a side plate 25 for co-rotatable movement therewith. The side plate 25 has a pair of outwardly extending T-shaped brackets 26 and 27 secured thereto which, in turn, are affixed to one end of each of the flexible ice trays 11 and 12, respectively. It is important to note that the T-shaped brackets 26 and 27 extend almost entirely across the width of the ice trays 11 and 12 and are securely fastened thereto across this entire width.

A pair of T-shaped brackets 29 and 30 are affixed to the opposite ends of the ice trays 11 and 12, respectively, and are journalled for rotatable movement within a side plate 31 which, in turn, is mounted on an output power shaft 32 of the ice tray assembly drive mechanism 14 for corotatable movement therewith. Each of the brackets 29 and 30 is affixed to the ice trays 11 and 12 in a manner similar to that in which the brackets 26 and 27 are affixed to the ice trays but the brackets 29 and 30 are rotatably mounted within the side plate 31 so that rotation of the bracket 30 (for instance) will act to rotate the end of the ice tray 12 adjacent the side plate 31 relative to the end of the tray adjacent the side plate 25 to apply torsion to the tray to eject ice blocks therefrom.

Figure 2:
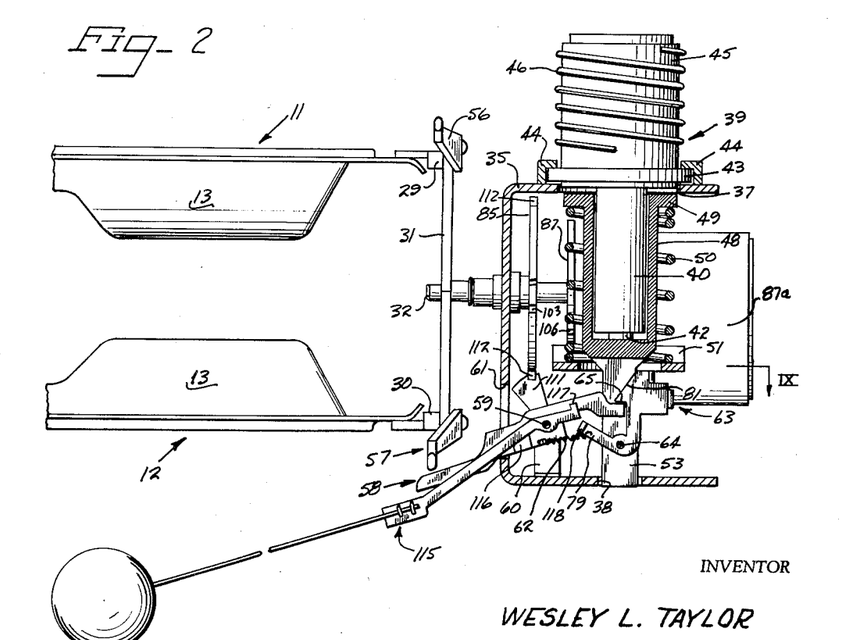
FIGURE 2 is a fragmental vertical sectional view of a portion of the ice making apparatus illustrated in FIGURE 1 and which shows the mechanism in a first position.
Figure 3:
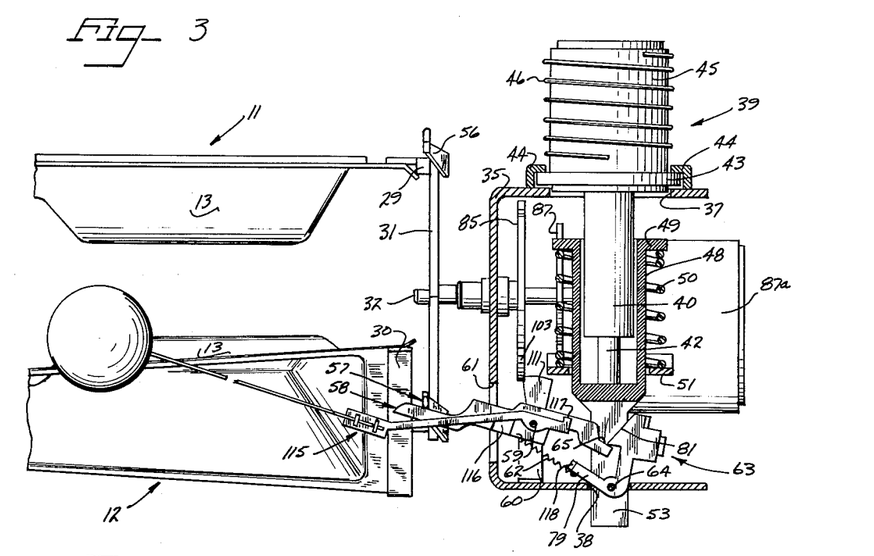
FIGURE 3 is a fragmental vertical sectional view which is similar in nature to FIGURE 2 but which shows the power member of a thermal sensitive element in an extended position and which illustrates twisting of one of the flexible ice trays.

Referring most particularly to FIGURE 2 in conjunction with FIGURE 1 it will be noted that a housing 35 is mounted on the rear wall of the freezing compartment 15 by means of a bracket 36. The housing 35 has a pair of oppositely disposed and coaxially aligned openings 37 and 38 formed therein within the upper and lower walls, respectively, thereof.

A thermal sensitive power unit 39 is mounted on the upper wall of the housing 35 and has its guide portion 40 extending through the radially enlarged aperture thereof into the interior of the housing. The thermal sensitive power unit 39 is of a type which is well known in the art and includes a heat sensing portion (not shown) which contains a fusible thermally expansible material and which has a flexible diaphragm therein forming one wall of the chamber containing the fusible thermally expansible material. A power member or piston 42 is slidably disposed within the guide 40 and abuts the flexible diaphragm within the power unit 39. Upon heating of the heat sensitive portion of the power unit 39 the fusible material therein expands causing flexure of the diaphragm and consequent extensible movement of the power member or piston 42 from the guide 40.

The power unit 39 has a collar 43 extending therearound which seats on the upper wall of the housing 35 while the guide portion 40 and the power member 42 thereof extend through the radially enlarged aperture 37 into the interior of the housing 35. A plurality of tabs 44 extend upwardly from the upper wall of the housing 35 adjacent the aperture 37 and are bent over the collar 43 to secure the power unit 39 in its proper position on the housing 35.

A cup 45 is fitted over the heat sensing portion of the power unit 39 which serves to provide a fluid chamber intermediate the cup and the outer wall of the heat sensing portion of the power unit 39 for containing a liquid so that the power unit 39 may be rendered responsive to the changes in temperature of fluid within the molds in the ice trays 11 and 12.

A resistance heater 46 (which is also diagrammatically illustrated in FIGURE 20) is wound about the cup 45 to provide a means for heating the cup, and accordingly the fluid disposed therein, to raise the ambient temperature about the thermal sensing portion of the power unit 39 to thereby effect extensible movement of the power member 42 from the guide 40. Upon deenergization of the resistor heater 46 the fluid within the cup 45 will cool at approximately the same rate as the fluid disposed within the ice trays since the ice trays and the power unit 39 are each disposed within the freezing compartment 15. Upon lowering of the ambient temperature about the heat sensitive portion of the power unit 39 the power member 42 will be retractably moved with respect to the guide 40 by a return spring which will hereafter be described. Such retractable movement of the power member 42 will, of course, not be effected until the ambient temperature about the heat sensitive portion of the power unit 39 has been lowered to a predetermined point.

A spring saddle 48 is slidably mounted on the guide 40 and is connected with the power member 42 so that it will move extensibly and retractably relative to the guide 40 with the power member 42. The saddle 48 also has an annular flange 49 formed therearound at the uppermost end thereof which acts as a seat for a return spring 50. The spring 50 has its opposite end seated on a spring stirrup 51 which depends from the upper wall of the housing 35 and which is more clearly illustrated in FIGURE 8. This spring acts to retractably move the power member relative to the guide 40 upon cooling of the thermally expansible material within the heat sensing portion of the power unit 39.

A depending element 53 is formed integrally with the spring saddle 48 and normally extends through the radially reduced aperture 38 in the lower wall of the housing 35.

Figures 5, 6, 7:
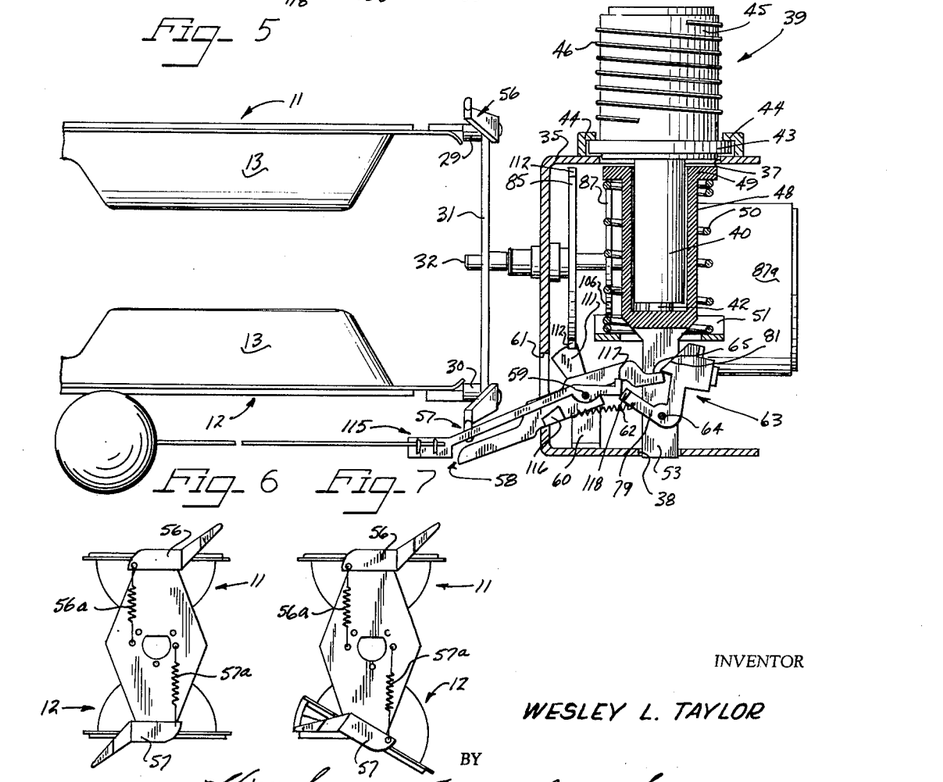
FIGURE 5 is a fragmental vertical sectional view which is similar in nature to FIGURES 2–4 but which illustrates the association of the various components of the mechanism when the ice sensing arm is prevented from returning to its normal position by abutment with ice blocks within a collection tray.
FIGURE 6 is an end view of the ice tray assembly when the tray is disposed in a normal position prior to flexure of the ice trays.
FIGURE 7 is a view which is similar in nature to FIGURE 6 but which shows the downwardly facing ice tray in a torqued position.

Lever arms 56 and 57 are connected to the brackets 29 and 30 for corotatable movement therewith so that rotation of the lever 57 (for instance) will effect rotatable movement of the bracket 30 thereby rotating the end of the ice tray 12 adjacent the end plate 31 relative to the end of the ice tray adjacent the end plate 25 to twist the ice tray 12 and thereby effect ejection of ice blocks therefrom into the collection basket 17. As shown in FIGURES 6 and 7, springs 56a and 57a interconnect the levers with the end plate 31 so that the levers are biased in a counterclockwise direction and so that the tray is positively biased to its molded configuration.

A drive lever 58 is pivotally mounted on a pin 59 which is supported by a pair of upstanding brackets 60 within the housing 35. The drive lever 58 extends exteriorly of the housing 35 through an opening 61 in the side wall thereof and terminates at a point adjacent the outermost end of the lever arm 57 so that pivotal movement of the drive lever 58 will act to rotatably move the lever arm 57 with respect to the end plate 31 to twist the ice tray 12. As shown in FIGURE 2, the drive lever 58 is abutting that portion of the housing 35 which defines the lower wall of the aperture 61 so that the drive lever 58 is disposed in its most counterclockwise rotated position. It will also be noted that the outermost end of the drive lever 58 is somewhat spaced from the outermost end of the lever arm 57 when the drive lever is in the position illustrated in FIGURE 2. This spacing permits the entire tray assembly 10 to be rotated to thereby dispose the lever arm 56 in the position of lever 57 in FIGURE 2 as will hereinafter be more fully explained.

A pawl 63 is disposed within an elongated slot formed in the element 53 and is pivotally mounted on the element by means of a pin 64 which extends through the bifurcated end of the element 53. The pawl 63 has a lip 65 formed at the upper end thereof which is engageable with the innermost end of the drive lever 58 so that upon downward movement of the element 53 the pawl 63 will be carried downwardly and the lip 65 will act against the drive lever 58 to pivot that lever in a clockwise direction about the pin 59. Such clockwise pivoted movement of the drive lever 58 will, of course, act to pivotally move the lever arm 57 to effect twisting of the ice tray 12 in the manner which has hereinbefore been described.

A tension spring 62 interconnects the pawl 63 with the drive lever 58 and serves the double purpose of biasing each of these members towards the positions illustrated in FIGURE 2.

Figure 9:
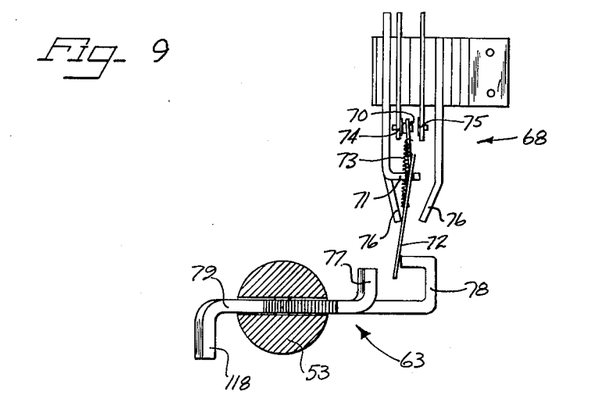
FIGURE 9 is a horizontal sectional view of a line switch for controlling operation of the entire ice making apparatus, and its associated operating pawl in a first position and which is taken along lines IX—IX of FIGURE 2.
Figure 20:
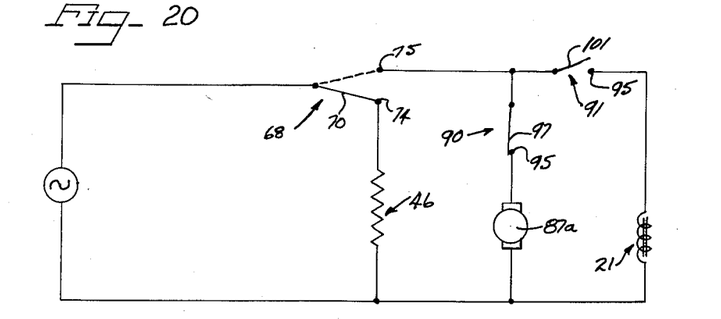
FIGURE 20 is a diagrammatic illustration of a wiring circuit which might be employed to operate an ice making apparatus of the type illustrated on the appended drawings and more completely described hereafter.

Referring particularly to FIGURES 9 and 20, an electrical snap action switch 68 is mounted on a laterally extending supporting wall 69 which is secured to the side walls of the housing 35. This snap action switch is of a type which is well known in the art and includes a snap blade 70 which is pivotally mounted on a support 71 and a snap lever 72 also pivotally mounted on the support 71 which is resiliently connected to the snap blade 70 by means of an overcenter spring 73. The snap blade and snap lever are each pivotally mounted on the support 71 so that when the snap lever 72 is rotated from the position illustrated in FIGURE 9 to the position illustrated in FIGURE 10, the point of connection of the spring 73 with the lever 72 will have moved past the plane of the blade 70 so that the blade 70 will be snapped from the position illustrated in FIGURE 9 to the position illustrated in FIGURE 10 by the spring 73. Conversely, when the lever is again pivotally returned to the position illustrated in FIGURE 9 the spring 73 will act to snap the blade 70 to the position shown in FIGURE 9. A pair of inturned ears 76 serve to limit pivotal movement of the lever 72.

In FIGURE 9 the snap blade 70 is shown as engaging a stationary contact 74 so as to close an energizing circuit through that stationary contact to effect energization of the resistor heater 46 also shown in FIGURE 20. As illustrated in FIGURE 20, when the snap blade 70 moves from the position shown in full lines to the position shown in broken lines (that is into engagement with the stationary contact 75 which is opposite the contact 74) deenergization of the resistor heater 46 is effected.

The pawl 63 has a pair of spaced inturned fingers 77 and 78 formed integrally therewith which are disposed on opposite sides of the snap lever 72 so that pivotal movement of the pawl 63 about the pin 64 will act to effect pivotal movement of the snap lever 72 to actuate the switch 68.

The pawl 63 also has a leg 79 formed integrally therewith which is disposed at an angle of approximately 70° with respect to the main body portion thereof. As shown most clearly in FIGURE 4 the leg 79 is adapted to abut that portion of the lower wall of the housing 35 which defines the radially reduced aperture 38 upon downward movement of the element 53 to effect pivotal movement of the pawl 63 from the position illustrated in FIGURE 2 to the position illustrated in FIGURE 4. Such pivotal movement, as shown most clearly in FIGURE 10 acts to move the finger 77 into engagement with the lever 72 to pivot the lever so as to snap the blade 70 out of engagement with the stationary contact 74 and into engagement with the stationary contact 75 to open the energizing circuit to the resistor heater 46.

Figure 4:
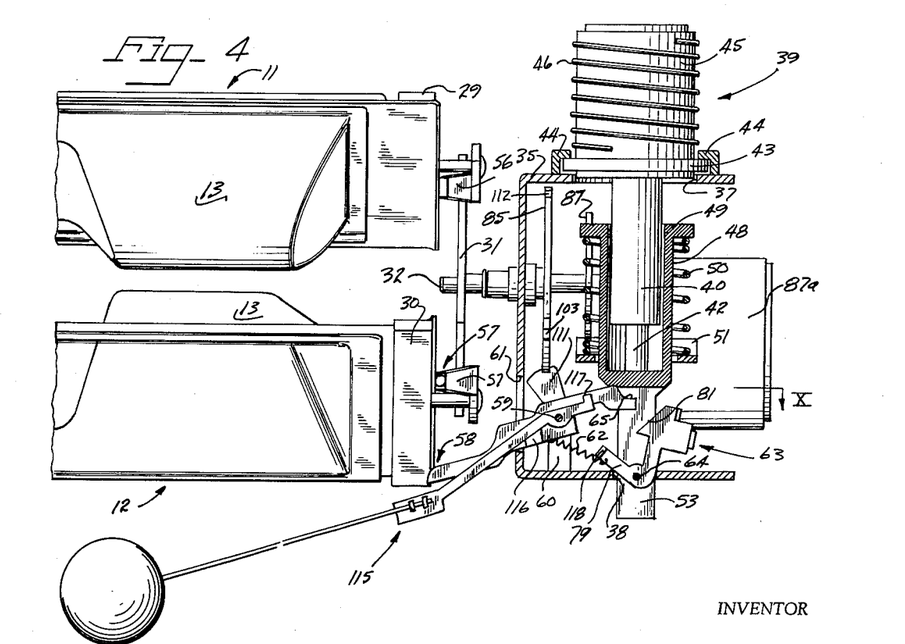
FIGURE 4 is a view which is similar in nature to FIGURES 2 and 3 but which shows the tray assembly rotated approximately 30°.

Simultaneously, pivotal movement of the pawl 63 in a clockwise direction as illustrated in FIGURE 2 will act to move the lip 65 thereof out of engagement with the drive lever 58 so that the drive lever 58 will be returned to the position illustrated in FIGURES 2, 4 and 5 by the spring 62.

After the energizing circuit to the resistor heater 46 has been opened the liquid within the cup 45 and the heat sensing portion of the power unit 39 will be permitted to cool, inasmuch as they are disposed within the freezing compartment 15, and upon cooling of the thermally expansible material within the heat sensing portion of the power unit 39 the spring 50 will act against the flange 49 on saddle 48 to return the power member 42 and the element 53 toward the position illustrated in FIGURE 2.

As noted above, spring 62 biases the pawl 63 in a counterclockwise rotated position. However, when the element 53 begins to move upwardly toward the position illustrated in FIGURE 2 a cam face 81 on the pawl 63 will move into engagement with the innermost end of the drive lever 58 so that the pawl will be pivoted in a clockwise direction until the element 53 has moved upwardly to such an extent that the lip 65 moves past the innermost end of the drive lever 58. At such time the spring 62 will act to return the pawl 63 to the position illustrated in FIGURE 2.

Thus, twisting of the ice tray 12 is effected by reciprocation of the power member 42 of the thermal sensitive actuating unit 39 by motion translation through the pawl 63, drive lever 58, and lever arm 57.

Figure 8:
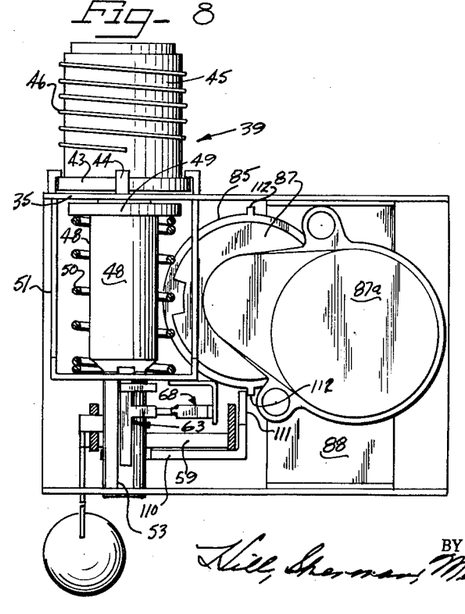
FIGURE 8 is an end view of the control mechanism for the ice making apparatus which is viewed from the line VIII—VIII in FIGURE 1.
Figure 11:
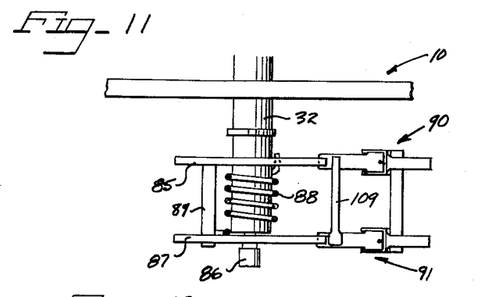
FIGURE 11 is a fragmental view of a pair of cooperating cams which are operable to control operation of the ice tray assembly drive.

Turning now more particularly to the means for effecting rotatable movement of the entire ice tray assembly 10, attention is directed to FIGURE 11 in conjunction with FIGURE 2 wherein the side plate 31 of the ice tray assembly is illustrated as being mounted on a shaft 32 which is journalled within a side wall of the housing 35. The shaft 32 has a cam 85 mounted thereon on the innermost end thereof. Coaxially aligned with the shaft 32 is an output power shaft 86 which extends from a synchronous motor 87a. The motor 87a (as shown in FIGURE 8) is mounted on a vertical bracket 88 which is in turn secured to the upper and lower walls of the housing 35. The shaft 86 is guided within the hollow interior of the innermost end of the shaft 32 but is not drivingly connected therewith.

A cam 87 is mounted on the end of the power shaft 86 adjacent the cam 85 for corotatable movement with the shaft 86. A torsion spring 88 encircles the innermost end of the shaft 32 and is connected at its opposite ends to the cam 85 and the cam 87 to provide a resilient drive connection between the shafts 86 and 32. A link 89 is connected to the face of the cam wheel 85 and has its outermost end received within a slot 90a formed within the face of the cam wheel 87 which is formed symmetrically about a locus of constant radius extending from the center of the cam wheel. The slot 90a consists of an arc of approximately 30° for reasons which will hereinafter become apparent.

Figure 12:
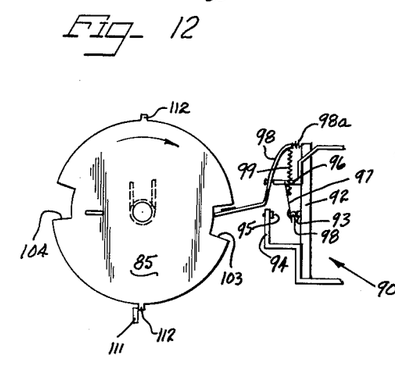
FIGURE 12 is a fragmental side elevational view of a first cam and showing its cooperation with an electrical switch.
Figure 13:
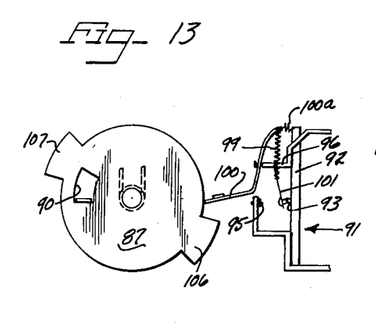
FIGURE 13 is a side elevational view of a second cam also showing its cooperation with an electrical switch.

As shown in FIGURES 11, 12 and 13, a pair of snap action switches 90 and 91 are mounted adjacent one another on a side wall of the housing 35. The snap action switches are identical in nature and comprise an insulated support 92 having a stationary contact 93 mounted thereon. A raised leg 94 is connected to and supported by the insulating support 92 and also has a stationary contact 95 positioned thereon opposite the contact 93. A support 96 is affixed to the insulating support 92 and has a snap blade 97 pivotally mounted thereon and electrically connected therewith which, in turn, has a contact member 98 formed thereon which is adapted to contact either of the stationary contacts 93 or 95. A snap lever is pivotally mounted on the support 96 and has an overcenter spring 99 connected at one end thereof which, in turn, is connected at its opposite end to the snap blade 97 so that pivotal movement of the snap lever 98 will act to pivotally move the snap blade 97 in the manner which is well known in the art.

The snap action switch 91 has identical components to that of the switch 90 but to facilitate an explanation of the operation thereof the snap lever in switch 91 is referred to as lever 100 while the snap blade is referred to as blade 101.

The snap lever 98 has its outwardly turned leg disposed within a slot 103 formed in the periphery of the cam 85. A substantially identical slot 104 is also formed in a diametrically opposed position on the cam 85. A tension spring 98a interconnects the end of the lever 98 which is connected to spring 99 with the insulation block 92 so as to bias the lever 98 in a clockwise direction to the position illustrated in FIGURE 12. Upon clockwise rotation of the cam 85 the lever 98 will be engaged by the peripheral edge of the cam and pivoted in a counterclockwise direction to the position illustrated in FIGURE 14 so that the overcenter spring 99 will act to pivot the movable contact blade 97 and into engagement with the stationary contact 95.

Similarly, a tension spring 100a interconnects the snap lever 100 with its respective insulating block to bias the lever 100 to a clockwise rotated position as is illustrated in FIGURE 13. The cam 87 has a pair of diametrically opposed lugs 106 and 107 formed thereon which are engageable with the snap lever 100 to effect counterclockwise pivotal movement thereof to actuate the switch 91. When the cam 87 has rotated so as to move the lug 107 or 106 into engagement with the snap lever 100, further rotation of the cam 87 will act to pivot the snap lever 100 in a counterclockwise direction to move the snap blade 101 out of engagement with the stationary contact 93 and into engagement with the contact 95.

As shown most clearly in FIGURE 11 a link arm 109 is connected to the snap lever 100 and insulated therefrom and extends over the snap lever 98 so that when the snap lever 100 is disposed in its most counterclockwise rotated position, the link arm 109 will act to hold the snap lever 98 in a similar position for reasons which will hereinafter become apparent.

Referring now particularly to FIGURE 20, it will be noted that the timer motor 87a is energized through the switch 68 and the snap action switch 90 while the solenoid coil of the shut off valve 21 is energizable through the switches 68 and 91. The electrical energizing circuits to the timer motor 87a and solenoid coil 21 will be closed when the snap blades 97 and 101 of the snap action switches 90 and 91, respectively are disposed in engagement with the stationary contacts 95.

Referring to FIGURE 2 in conjunction with FIGURES 8 and 12, it will be noted that a laterally extending arm 110 is formed integrally with the drive lever 58 and that this arm terminates in an upturned fan-tail lug 111 which is positionable in the path of movement of either of a pair of peripheral lugs 112 formed integrally with the cam 85 and diametrically opposed from one another. From a consideration of FIGURE 12, it will be understood that clockwise rotatable movement of the cam 85 is prevented so long as the fan-tail lug 111 is disposed in the path of movement of the peripheral lug 112. However, when the drive lever 58 has been rotated to its greatest clockwise rotated position by downward movement of the element 53 and pawl 63 the fan-tail lug 111 will be moved out of engagement with the peripheral lug 112 to permit clockwise rotatable movement of the cam 85.

Figure 14:
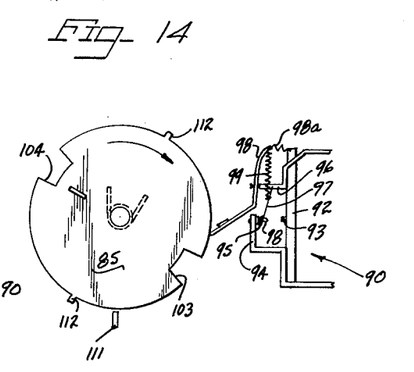
FIGURE 14 is a side elevational view which is similar to FIGURE 12 but which shows the first cam in a different position.
Figure 15:
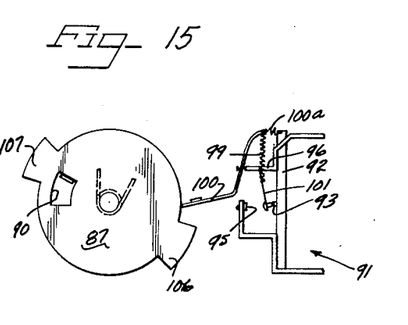
FIGURE 15 is a fragmental side elevational view of the second cam and showing it in a rotated position.

Referring now to FIGURES 11, 12 and 13, it will be noted that when the cams 85 and 87 are in the relative positions shown, the torsion spring 88 is under stress so that the cam 85 is biased in a clockwise direction. However, such clockwise rotatable movement of cam 85 is prevented by abutment of the fan-tail lug 111 with the peripheral lug 112. Upon movement of the drive lever 58 to its greatest clockwise rotated position the fan-tail lug 111 will be moved out of engagement with the peripheral lug 112 so that the torsion spring 88 will act to rotate the cam 85 in a clockwise direction. As shown in FIGURES 14 and 15, however, clockwise rotatable movement of the cam 85 will be limited to about 30° inasmuch as the link arm 89 will contact the opposite end of the slot 90a within cam 87 from that within which it is initially disposed.

Rotatable movement of the cam 85 from the position illustrated in FIGURE 12 to the position illustrated in FIGURE 14 will act to pivot the snap lever 98 to thereby move the snap blade 97 out of engagement with contact 93 and into engagement with contact 95 thereby energizing the timer motor 87a to effect rotatable movement of the entire ice tray assembly 10 (assuming that the contact 70 illustrated in FIGURE 20 is in the broken line position).

Upon energization of the timer motor, the cam 87 will be rotated in a clockwise direction from the position illustrated in FIGURES 13 and 15 and the cam 85 and accordingly the entire ice tray assembly 10 will likewise be rotated in a clockwise direction through the torsion spring 88. When the ice tray assembly 10 has been so rotated as to dispose one of the ice trays in a liquid receiving position the cams will nearly have rotated to the positions illustrated in FIGURES 16 and 17. At this point in the cycle the peripheral lug 107 on the cam 87 will move into engagement with the snap lever 100 to effect counterclockwise pivotal movement of that lever to thereby move the snap blade 101 out of engagement with contact 93 and into engagement with contact 95 to effect energization of the solenoid coil 21 to thereby permit fluid flow through the fluid line 20 and filler spout 19 to the upwardly facing ice tray.

It will be understood that in the illustrated embodiment of the invention, the trays are rotated to an upwardly facing direction prior to the time when filling of the trays by the slug valve is effected. In some ice making devices using rotatable trays, filling of the trays is initiated prior to the time when the trays have completed their rotation. In such devices, more complicated ice trays are necessitated to prevent spilling of the fluid during the filling of the trays. In accordance with my invention however, the cam wheels 85 and 87 are cooperable with one another through the pin 89 and slot 90a to dispose the ice trays in an upwardly facing position prior to the filling operation.

The amount of fluid directed to the ice tray will be determined by the time interval during which the lug 107 is disposed in engagement with the snap lever 100. Subsequent to the time when the lug 107 moves into engagement with snap lever 100 the cam 85 will have rotated to the position wherein the slot 104 moves by the outermost end of the snap lever 98. By this time in the cycle of operation, it will be understood that the drive lever 58 will have rotated to the position illustrated in FIGURE 2 so that the fan-tail lug 111 will again be disposed within the path of rotary movement of the peripheral lug 112.

Figure 16:
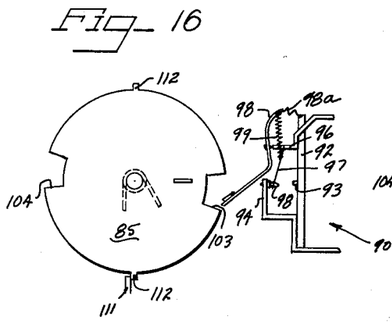
FIGURE 16 is a side elevational view of the first cam in another position.
Figure 17:
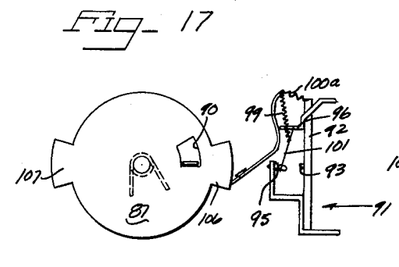
FIGURE 17 is a side elevational view of the second cam in a third position.
Figure 18:
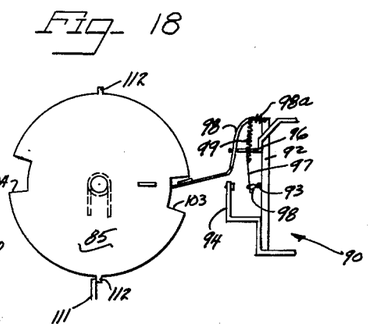
FIGURE 18 is a side elevational view of the first cam in a final position.
Figure 19:
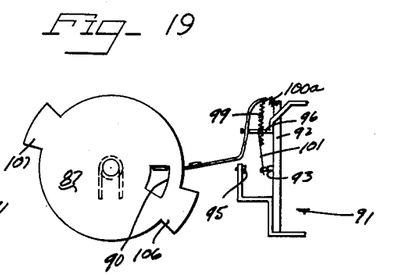
FIGURE 19 is a side elevational view of the second cam in a final position.

Although the outermost end of the snap lever 98 is disposed adjacent the slot 104 the lever 98 will not be pivoted in a clockwise direction to the position illustrated in FIGURE 12 inasmuch as the link arm 109 extending from the snap lever 100 will act to maintain the snap lever 98 in the position illustrated in FIGURE 16. Rotary movement of the cam 87 from the position illustrated in FIGURE 17 to the position illustrated in FIGURE 19 will act to "wind up" the torsion spring 88 since the cam 85 is prevented from rotating in a clockwise direction. When the cam 87 has rotated so as to move the peripheral lug 107 out of engagement with the snap lever 100 the lever 100 will be pivoted in a clockwise direction by the tension spring 109a and such movement will permit the snap lever 98 to similarly be pivoted in a clockwise direction by spring 98a so that each of switches 90 and 91 will be opened.

Figure 10:
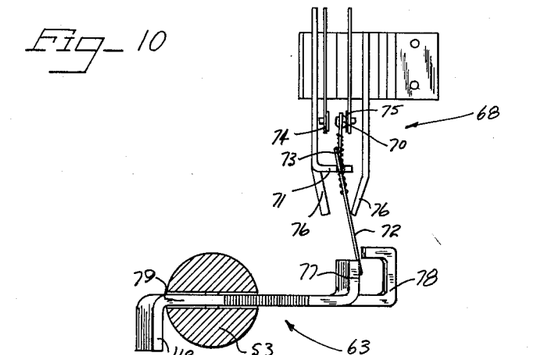
FIGURE 10 is a horizontal sectional view which is similar in nature to FIGURE 9 but which is taken along lines X—X of FIGURE 4.

Referring now particularly to FIGURES 2, 5 and 10, it will be noted that an ice sensing arm 115 is pivotally mounted on the pin 59 and that the arm is normally disposed in engagement with a lug 116 extending laterally outwardly from the drive lever 58 so that clockwise pivotal movement of the lever 58 will move the sensing arm 115 in a clockwise direction. A stop 117 is formed on the innermost end of the sensing arm 115 which is engageable with an outturned lug 118 formed on the arm 79 of pawl 63.

Each time the drive lever 58 is rotated in a clockwise direction to twist the downwardly facing ice tray the sensing arm 115 will be moved upwardly. Conversely, when the drive lever 58 is permitted to return to its greatest counterclockwise rotated position the sensing arm 115 will also return unless its return movement is prevented by abutment with ice blocks disposed within the collection basket 17. If the level of ice blocks within the basket 17 is so great that the ice sensing arm 115 can return in a counterclockwise direction only as far as that position illustrated in FIGURE 5 further cycling of the ice making apparatus will be stopped in the following manner: When the sensing arm 115 is in the position illustrated in FIGURE 5 the lug 117 will be disposed in the path of movement of the lug 118 so that when the lip 65 of the pawl 63 has moved past the innermost end of the drive lever 58 its return movement will be prevented due to the abutment of members 117 and 118. Thus, as long as the ice sensing arm 115 remains in the position illustrated in FIGURE 5 the pawl 63 will remain in its clockwise rotated position so that the snap blade 70 will remain in engagement with the stationary contact 74. So long as the snap blade 70 is thus prevented from being moved into engagement with the stationary contact 75 rotation of the ice tray assembly by the synchronous motor 87a and filling of the ice trays with water through the valve 21 will be prevented.

I have thus provided an ice making apparatus utilizing a plurality of flexible ice trays in which the ice trays are twisted to effect ejection of ice blocks therefrom and in which the entire ice tray assembly is rotated as a function of temperature. I have used a thermal sensitive power unit not only for sensing temperature and thereby determining the time interval between ice cube ejection cycles but have also used the same thermal sensitive power unit for effecting torquing of the ice trays to eject ice blocks therefrom.

It will be understood that this embodiment of the invention has been used for illustrative purposes only and that various modifications and variations in the present invention may be effected without departing from the spirit and scope of the novel concepts thereof.

I claim as my invention:

1. An automatic ice making apparatus comprising a support, an ice tray assembly rotatably mounted on said support and disposed within a freezing compartment, a plurality of flexible ice trays for containing liquid to be frozen into ice blocks mounted on said assembly and facing outwardly in different directions from the rotational axis thereof, a rectilinearly movable element mounted on said support, electrically energizable means for moving said element as a function of the rate of freezing of liquid disposed within said freezing compartment, motion translation means interconnecting said element with at least one of said trays to apply torsion to said one of said trays to effect the ejection of ice blocks therefrom, and independent means for rotating said assembly.

2. An automatic ice making apparatus comprising a support, an ice tray assembly rotatably mounted on said support and disposed within a freezing compartment, a plurality of flexible ice trays for containing liquid to be frozen into ice blocks mounted on said assembly and facing outwardly in different directions from the rotational axis thereof, a rectilinearly movable element mounted on said support, means for moving said element as a function of the rate of freezing of liquid disposed within said freezing compartment, motion translation means interconnecting said element with at least one of said trays to apply torsion to said one of said trays to flex the same and thereby effect ejection of ice blocks therefrom, motor means for rotating said assembly, and electromechanical means for energizing said motor means subsequent to flexure of said one of said ice trays.

3. An automatic ice making apparatus comprising a support, an ice tray assembly rotatably mounted on said support and disposed within a freezing compartment, a plurality of flexible ice trays for containing liquid to be frozen into ice blocks mounted on said assembly and facing outwardly in different directions from the rotational axis thereof, a rectilinearly movable element mounted on said support, means for moving said element as a function of the rate of freezing of liquid disposed within said freezing compartment, motion translation means interconnecting said element with at least one of said trays to apply torsion to said one of said trays to flex the same to effect ejection of ice blocks therefrom, a collection tray for collecting the ice blocks ejected from said ice trays, motor means for rotating said assembly, and means for controlling the energization of said first mentioned means and said motor means as a function of the level of ice blocks within said collection tray.

4. An automatic ice making apparatus comprising a support, and ice tray assembly rotatably mounted on said support and disposed within a freezing compartment, a plurality of flexible ice trays for containing liquid to be frozen into ice blocks mounted on said assembly and facing outwardly in different directions from the rotational axis thereof, electrically energizable means for effecting flexure of a downwardly facing ice tray to consequently effect ejection of ice blocks therefrom, motor means for rotating said assembly, a collection tray disposed beneath said ice tray assembly for collecting ice blocks ejected from said ice trays, and means for controlling the energization of said first mentioned means and said motor means as a function of the level of ice blocks within said collection tray.

5. An automatic ice making apparatus comprising a support, an ice tray assembly rotatably mounted on said support and disposed within a freezing compartment, a plurality of flexible ice trays for containing liquid to be frozen into ice blocks mounted on said assembly and facing outwardly in different directions from the rotational axis thereof, a thermal sensitive power unit mounted on said support within said freezing compartment having an element extensible therefrom upon predetermined ambient temperature conditions therearound, means for disposing the temperature sensing portion of said power unit within a liquid medium having the same freezing rate as the liquid to be frozen within said ice trays, means for raising the temperature of the liquid surrounding said power unit to at least as high a temperature as the liquid used for filling said ice trays at the time of filling of said ice trays, motion translation means interconnecting said element with at least one of said trays to apply torsion to said one of said trays to flex the same to effect ejection of ice blocks therefrom upon extensible movement of said element from said power unit, motor means for rotating said assembly, electromechanical means for controlling energization of said motor means as a function of the relative position of said element with respect to said power unit, a collection tray disposed beneath said assembly for collecting ice blocks ejected from said ice trays, and means for controlling the energization of said motor means as a function of the level of ice blocks within said collection tray.

References Cited in the file of this patent

UNITED STATES PATENTS

| | | |
|---|---|---|
| 2,145,719 | Geyer | Jan. 31, 1939 |
| 2,212,405 | Rose et al. | Aug. 20, 1940 |
| 2,407,058 | Clum | Sept. 3, 1946 |
| 2,559,414 | Erickson | July 3, 1951 |
| 2,778,198 | Heath | Jan. 22, 1957 |
| 2,808,707 | Chace | Oct. 8, 1957 |
| 2,833,123 | Kennedy | May 6, 1958 |
| 2,846,854 | Galin | Aug. 12, 1958 |
| 2,941,379 | Nelson | June 21, 1960 |
| 2,942,435 | Nelson | June 28, 1960 |